Patented Nov. 12, 1935

2,020,675

UNITED STATES PATENT OFFICE 2,020,675

DYEING OF TEXTILE MATERIALS

George Holland Ellis, Spondon, near Derby, England, assignor to Celanese Corporation of America, a corporation of Delaware No Drawing. Application December 26, 1931, Serial No. 583,406. In Great Britain January 5, 1931

6 Claims. (Cl. 8—5)

This invention relates to the colouration of materials made of or containing cellulose acetate or other cellulose esters or ethers.

I have found that certain indigoid colouring matters in which an indole or thionaphthene residue is united to a residue of a naphthol, anthrol or other residue not of the indole or thionaphthene type, have very good affinity for cellulose ester and ether materials. I have found that by their aid a very wide range of valuable colourations may be produced on cellulose ester and ether materials.

In accordance with the present invention therefore, the colouration of cellulose ester and ether materials is effected by means of indigoid dyestuffs in which an indole or thionaphthene residue is united with a residue of a different kind, for example a residue of an aromatic hydroxy compound or the corresponding keto-methylene tautomeride.

The indigoid dyestuffs applied in the colouration of cellulose ester and ether materials in accordance with the invention may thus be of the general formula:

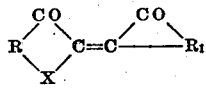

or

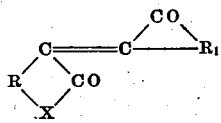

wherein R represents an aryl residue, X represents a sulphur atom or an NH group, and $R_1$ represents an organic residue which is not a residue of an indole or thionaphthene compound. Again the non-indole or non-thionaphthene residue, instead of possessing an ortho-quinonoid structure as in the foregoing formulae, may possess a para-quinonoid structure as for instance in the case of dyestuffs obtainable by condensing isatins or thioisatins with carbazole or thiodiphenylamine. The foregoing dyestuffs will hereinafter be termed "semi-indigoid dyestuffs" in order to distinguish them from the well-known indigoid dyestuffs in which an indole or thionaphthene residue is united with a second residue of similar character.

In the semi-indigoid dyestuffs applied in accordance with the invention the indole or thionaphthene residue may be of any desired character, for example the radicle R may be a benzene, naphthalene or anthracene residue which may be further substituted in the nucleus in any desired manner, for example by means of halogen atoms or alkoxy groups. In general dyestuffs of the required semi-indigoid type may be produced by condensing isatins (di-keto-dihydroindoles) or thio-isatins (di-keto-di-hydro-thionaphthenes) or their nuclear substitution products with compounds containing a —$CH_2CO$— group or a group capable of reacting as a —$CH_2CO$— group. Again, semi-indigoid dyestuffs may be prepared by condensing indoxyls ($\beta$-oxy indoles) or thio indoxyls ($\beta$-oxy-thionaphthenes) or their $\alpha$-carboxylic acids with compounds containing the di-ketone grouping CO.CO. In some cases one dyestuff may be prepared by either of the foregoing methods.

The isatins or thio-isatins may be utilized either as such or in the form of their $\alpha$-derivatives in which the oxygen of the $\alpha$-ketonic group has been replaced by a reactive group or atoms, for example by the arylimide group or by chlorine or bromine atoms. In general the dyestuff obtained by means of the $\alpha$-derivative of the isatin is not the same as that obtained by means of the isatin itself, but is an isomer thereof. It has been found that the dyestuffs obtainable by condensing isatin or thio-isatin $\alpha$-derivatives and particularly the nuclear halogen substitution products of these compounds with aromatic hydroxy compounds, particularly $\alpha$-naphthol, yield especially useful results.

As examples of isatins or thioisatins which may be used for the preparation of dyestuffs to be applied in accordance with the invention, may be mentioned the following:—isatin and its nuclear substitution products, for example its chlorine, bromine, or alkoxy derivatives e. g. 5:7-dichloror 5:7-dibrom-isatin; thioisatin and its nuclear substitution products, for example its halogen or alkyloxy or methyl derivatives, e. g. 5:7-di-bromthioisatin or 5-ethoxy-thioisatin; naphthisatins, for example 1:2-, 2:1- or 2:3-naphthisatins or their halogen or other nuclear substitution products e. g. 8-chlor-1:2-naphthisatins, and naphthioisatins, for example 1:2-, 2:1-, or 2:3-naphthioisatins or their nuclear substitution products e. g. the chlor- or brom- derivatives obtainable by chlorinating or brominating the parent naphthisatins. Any of these isatins or thioisatins may be used in the form of their $\alpha$-chlorides, $\alpha$-anils, or other reactive $\alpha$-derivatives, for example isatin $\alpha$-chloride or thioisatin $\alpha$-paradimethylamino-phenylimide.

For condensation with the foregoing isatins and thioisatins and their derivatives, there may be employed phenols, naphthols, and oxy-acenaphthenes, for example α-naphthol, or 4-oxyacenaphthene, or derivatives thereof, for example 4-methoxy-, 4-chlor-, 4-brom-, or 4-ethylthio-1-naphthol.

As previously explained there may also be employed semi-indigoid dyestuffs obtainable by condensing indoxyls or thioindoxyls with compounds containing the diketone grouping —CO.CO—. For this purpose the indoxyls or thioindoxyls corresponding with the previously mentioned isatins and thioisatins may be employed, for example 5:7-dibrom-indoxyl, 5:7-dibrom-thio-indoxyl, 2:3- or 2:1-naphthioindoxyl, anthracene -2:3-indoxyl, or -thioindoxyl, and anthraquinone -2:3-indoxyl.

The semi-indigoid colouring matters may be applied to textile or other materials made of or containing cellulose esters or ethers in any convenient manner and either in the reduced or in the unreduced state. In the case of utilizing them in the reduced state they may be applied from alkaline vats prepared in any desired manner, for example with hydrosulphite and caustic alkali or with hydrosulphite and ammonia or substituted ammonias, for example alkylamines and substituted alkylamines, e. g., monomethyl-, monoethyl-, or monopropyl-amine or mono- di- or tri-ethanolamine, pyridine, piperidine or the like. Vats prepared with the aid of methylamine have been found particularly convenient. Alkaline vats prepared with the aid of alkali salts of hydroxy and polyhydroxy cyclic compounds as described in U. S. Patent No. 1,716,720, may also be employed with advantage. The reduced dyestuffs may subsequently be oxidized on the materials, if necessary, for example by exposure to air or by treatment in oxidizing baths, for example a bath containing soap and hydrogen peroxide or sodium perborate.

In the unreduced condition the dyestuffs may be applied to the materials in the form of suspensions or dispersions prepared in any convenient manner, for example by grinding (e. g., in colloid mills), by dissolving in a solvent and mixing with water containing protective colloids and/or dispersators, or by treating with dispersing agents, whether alone or in the presence of protective colloids and/or liquids e. g., water. If desired the colouring matters may first be converted into more or less concentrated preparations, whether liquid, solid, or semi-solid, by admixture with dispersing agents and/or protective colloids, which preparations may subsequently be diluted with water with or without additional dispersing agent and/or protective colloid, in order to form dyebaths, printing pastes, etc. suitable for application to the materials. As dispersing agents particular mention may be made of those described in U. S. Patents Nos. 1,618,413, 1,618,414, 1,694,413 and 1,716,721, and U. S. applications S. Nos. 134,138 filed 7th September, 1926, 390,423 filed 4th September, 1929, and 390,-424 filed 4th September, 1929, which may, if desired, be used either alone or in conjunction with auxiliary solvents as described in U. S. Patents Nos. 1,690,481 and 1,803,008.

The semi-indigoid colouring matters, whether reduced or unreduced may be applied by dyeing, printing, stenciling or any other convenient process. They may likewise be employed for the colouration of discharge effects on cellulose ester and ether materials. For this purpose they may be used in reduction discharges, e. g., formaldehyde sulphoxylate preparations in which they are present in the reduced form, or they may be utilized in oxidizing or reducing discharges in which they are present in the unreduced form.

The materials coloured in accordance with the present invention may be made of or contain any desired cellulose esters or ethers. As examples may be mentioned cellulose acetate, formate, propionate or butyrate, or the esterified fibrous products obtainable by treating cotton or other cellulosic fibre, whether previously alkalized or not, with esterifying agents, e. g., acid anhydrides or chlorides including p-toluene-sulphonic chloride or other aromatic sulphochlorides. As examples of cellulose ethers may be mentioned methyl, ethyl or benzyl cellulose or the analogous condensation products of cellulose and glycols or other polyhydric alcohols. Mixed materials comprising one or more cellulose ester or ether materials together with other materials, for example wool, silk, cotton or a regenerated cellulose type of artificial silk may likewise be coloured by the process of the invention. In such cases the various fibres may be coloured in solid or contrasting shades according to their affinities for the dyestuffs under the particular conditions of application. If desired the non-ester or non-ether portions of the material may be dyed with appropriate colouring matters therefor, before or after the colouration of the cellulose ester or ether portion of the material in accordance with the invention.

The invention is illustrated but not limited by the following examples:—

*Example I*

To dye a blue shade on 1 kilogram of cellulose acetate knitted goods:—

200 grams of a 10% water paste of 2-indole-2'-naphthalene indigo of the formula

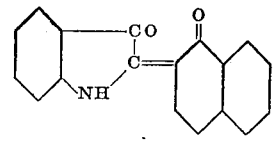

obtained in a finely divided form, for example, by precipitation from sulphuric acid, are mixed with 40 ccs. Turkey red oil, and diluted with hot soft water containing ½ gram per litre soap. The dispersion thus obtained is passed through a filter cloth into a dyebath containing 25 litres ¼ gram per litre soap solution, and the goods entered. The temperature is then raised to 80° C. and maintained thereabout for 1–2 hours. When the desired shade has been achieved the goods are lifted, washed off well, and dried or otherwise treated as requisite.

*Example II*

To dye a red shade on 1 kilogram of cellulose acetate yarn in hank form:—

200 grams of a 10% water paste of 2-thionaphthene-1'- naphthalene indigo of the formula

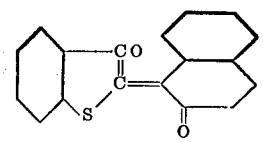

in a finely divided form, are dispersed and added to a dyebath exactly as described in Example I. The yarn is entered and the dyeing operation carried out at 75° C. for 2 hours when the goods will have acquired a bluish red shade. They are now lifted, rinsed, and dried or otherwise treated as requisite.

*Example III*

To dye a blue shade on one kilogram of cellulose acetate yarn in hank form:—

20 grams of 2 - indole - 2' - naphthalene indigo of the formula given in Example I powder are wetted out with a little Turkey red oil, diluted to 6 litres with soft water at 60° C., 20 grams of caustic soda added, and sodium hydrosulphite powder then sprinkled in till the dyestuff is vatted, about 40 grams being required. This stock solution is then added to 25 litres of soft water at 60° C. previously sharpened with hydrosulphite, the goods entered, and worked for 1–1½ hours at this temperature. The goods are now lifted, hung in air till oxidation is complete, and then soaped for ¼ hour in ¼ gram per litre soap and 1 gram per litre sodium perborate. They are now washed off well, and dried or otherwise treated as requisite.

In place of the dyestuffs specified in the examples, the following dyestuffs may be used:—

2 - indole - 2'(5' - phenylamino) - benzene indigo of the formula

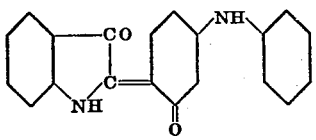

(from isatin α-chloride and m-oxy-diphenylamine) _____ Grey violet.

2 - thionaphthene - 2' - naphthaleneindigo of the formula

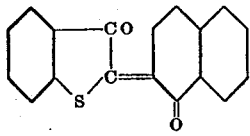

(from thioindoxyl carboxylic acid and β-napthoquinone) _____ Reddish blue.

2 - (5:7 - dibromindole) - 2' - 4'bromnaphthalene) -indigo of the formula

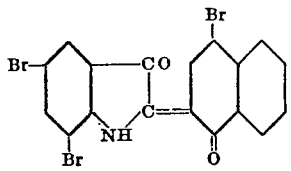
_____ Blue.

Dyestuff of the formula

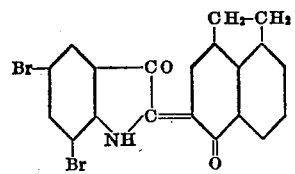

from 5:7-dibromisatin-α-chloride and 4-oxyacenaphthene _____ Blue.

What I claim and desire to secure by Letters Patent is:—

1. Process for the coloration of organic derivatives of cellulose which comprises applying thereto an indigoid dyestuff of the general formula

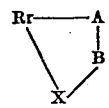

wherein R represents a benzene nucleus, X represents sulphur and of A and B one represents the group CO while the other represents a carbon atom directly united to a carbon atom forming part of a naphthalene nucleus.

2. Process for the coloration of cellulose acetate, which comprises applying thereto an indigoid dyestuff of the general formula

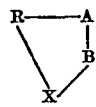

wherein R represents a benzene nucleus, X represents sulphur and of A and B one represents the group CO while the other represents a carbon atom directly united to a carbon atom forming part of a naphthalene nucleus.

3. Process for the coloration of organic derivatives of cellulose, which comprises applying thereto 2-thionaphthene-2'-naphthalene indigo.

4. Process for the coloration of cellulose acetate, which comprises applying thereto 2-thionaphthene-2'-naphthalene indigo.

5. Process for the coloration of organic derivatives of cellulose, which comprises applying thereto 2-thionaphthene-1'-naphthalene indigo.

6. Process for the coloration of cellulose acetate, which comprises applying thereto 2-thionaphthene-1'-naphthalene indigo.

GEORGE HOLLAND ELLIS.

Certificate of Correction

Patent No. 2,020,675.  November 12, 1935.

GEORGE HOLLAND ELLIS

It is hereby certified that error appears in the printed specification of the above numbered patent requiring correction as follows: Page 3, second column, lines 18–23, claim 1, strike out the formula and insert instead

and that the said Letters Patent should be read with this correction therein that the same may conform to the record of the case in the Patent Office.

Signed and sealed this 24th day of December, A. D. 1935.

[SEAL.]

LESLIE FRAZER,
*Acting Commissioner of Patents.*